(12) United States Patent
Guilley et al.

(10) Patent No.: US 9,197,412 B2
(45) Date of Patent: Nov. 24, 2015

(54) LOW-COMPLEXITY ELECTRONIC CIRCUIT PROTECTED BY CUSTOMIZED MASKING

(75) Inventors: Sylvain Guilley, Paris (FR); Jean-Luc Danger, Antony (FR)

(73) Assignee: Institut Telecom—Telecom Paris Tech, Paris (FR)

( * ) Notice: Subject to any disclaimer, the term of this patent is extended or adjusted under 35 U.S.C. 154(b) by 225 days.

(21) Appl. No.: 13/509,494

(22) PCT Filed: Nov. 8, 2010

(86) PCT No.: PCT/EP2010/067064
§ 371 (c)(1),
(2), (4) Date: Jun. 21, 2012

(87) PCT Pub. No.: WO2011/057991
PCT Pub. Date: May 19, 2011

(65) Prior Publication Data
US 2013/0129081 A1    May 23, 2013

(30) Foreign Application Priority Data

Nov. 13, 2009    (FR) .................................... 0958030

(51) Int. Cl.
*H04L 9/28* (2006.01)
*H04L 9/00* (2006.01)
*H04L 9/06* (2006.01)

(52) U.S. Cl.
CPC .................. *H04L 9/28* (2013.01); *H04L 9/003* (2013.01); *H04L 9/0618* (2013.01); *H04L 2209/046* (2013.01); *H04L 2209/12* (2013.01)

(58) Field of Classification Search
CPC ....... G06F 21/558; G06F 21/72; G06F 21/75; G06F 21/85; G06F 2221/2123; G06F 9/3001; G06F 9/30101; G06F 9/30181; G06F 9/321; G06F 9/3836; G06F 21/556; H04L 9/003; H04L 2209/12; H04L 2209/046; H04L 2209/08; H04L 9/0625; H04L 9/0631; H04L 9/0618; H04L 2209/24; H04L 9/28; H04L 2209/04; H04L 9/002; H04L 9/0668
See application file for complete search history.

(56) References Cited

U.S. PATENT DOCUMENTS 5,652,796 A  *  7/1997  Barraza et al. .................. 380/29
6,278,783 B1 *  8/2001  Kocher et al. ................. 380/277
(Continued)

FOREIGN PATENT DOCUMENTS

CN    1989726 B    6/2007
EP    0981223 A2   2/2000
(Continued)

OTHER PUBLICATIONS

H. Bersini and J. Carneiro (Eds.): ICARIS 2006, LNCS 4163, pp. 122-135, 2006. Springer-Verlag Berlin Heidelberg 2006.*
(Continued)

*Primary Examiner* — Michael R Vaughan
(74) *Attorney, Agent, or Firm* — Baker & Hostetler LLP

(57) ABSTRACT

A cryptography circuit protected by masking, said circuit including means for encrypting binary words using at least one key $k_r^c$, means for applying linear processing operations and nonlinear processing operations to said words and means for masking said words. The binary words are unmasked upstream of the nonlinear processing operations by using a mask $k_r^i$ and masked downstream of said processing operations by using a mask $k_{r+1}^i$, the masks $k_r^i$ and $k_{r+1}^i$ being chosen from a set of masks that is specific to each instance of the circuit.

14 Claims, 4 Drawing Sheets

(56) References Cited

U.S. PATENT DOCUMENTS

| | | | |
|---|---|---|---|
| 6,940,975 B1* | 9/2005 | Kawamura et al. | 380/37 |
| 7,142,670 B2* | 11/2006 | Chari et al. | 380/28 |
| 7,787,620 B2* | 8/2010 | Kocher et al. | 380/29 |
| 7,848,514 B2* | 12/2010 | Gebotys | 380/28 |
| 8,184,806 B2* | 5/2012 | Gebotys | 380/28 |
| 2001/0053220 A1* | 12/2001 | Kocher et al. | 380/29 |
| 2003/0044003 A1* | 3/2003 | Chari et al. | 380/28 |
| 2004/0008841 A1* | 1/2004 | Aoki et al. | 380/42 |
| 2004/0170121 A1* | 9/2004 | Kim et al. | 370/208 |
| 2005/0232430 A1 | 10/2005 | Gebotys | |
| 2005/0259814 A1* | 11/2005 | Gebotys | 380/28 |
| 2006/0140403 A1* | 6/2006 | Moskowitz | 380/54 |
| 2006/0256963 A1* | 11/2006 | Gebotys | 380/205 |
| 2007/0195949 A1* | 8/2007 | Okochi et al. | 380/28 |
| 2007/0211890 A1* | 9/2007 | Gebotys | 380/28 |
| 2008/0292100 A1* | 11/2008 | Komano et al. | 380/29 |
| 2009/0086976 A1* | 4/2009 | Scian | 380/277 |
| 2009/0110197 A1* | 4/2009 | Michaels | 380/268 |
| 2010/0086126 A1* | 4/2010 | Yokota et al. | 380/28 |
| 2011/0131395 A1* | 6/2011 | Georgiades et al. | 712/221 |
| 2011/0170691 A1* | 7/2011 | Liardet et al. | 380/259 |

FOREIGN PATENT DOCUMENTS

| | | |
|---|---|---|
| EP | 1722502 A1 | 11/2006 |
| WO | 2009/074728 A1 | 6/2009 |

OTHER PUBLICATIONS

Kocher et al., "Differential Power Analysis" Proceedings of CRYPTO'99, vol. 1666 LNCS, pp. 388-397, Springer-Verlag, 1999.

Kocher et al., "Timing Attach on Implementations of Diffie-Hellman", RSA, DSS and Other Systems, Proceedings of CRYPTO'96, vol. 1109 LNCS, pp. 104-113, Springer-Verlag 1996.

Peeters et al., "Improved Higher Order Side-Channel Attacks with FPGA Experiments", Cryptographic Hardware and Embedded Systems—Proceedings of CHES, vol. 3659 LNCS, pp. 309-323. Springer-Verlag, 2005.

Notification of the First Office Action issued in CN Patent Application No. 201080056401.9 dated Mar. 4, 2014.

Chien, Hung-Yu, "Tree-Based Matched RFID Yoking Making it More Practical and Efficient", I.J Computer Network and Information Security, 2009, vol. 1, pp. 1-8 Published Online Oct. 2009 in MECS (http://www.mecs-press.org/).

International Search Report issued in PCT/EP2010/067064 dated Dec. 10, 2010.

Search Report issued in FR Application No. 0958030 dated Jun. 28, 2010.

* cited by examiner

LOW-COMPLEXITY ELECTRONIC CIRCUIT PROTECTED BY CUSTOMIZED MASKING

CROSS-REFERENCE TO RELATED APPLICATIONS

This application is a National Stage of International patent application PCT/EP2010/067064, filed on Nov. 8, 2010, which claims priority to foreign French patent application No. FR 09 58030, filed on Nov. 13, 2009, the disclosures of each of which are incorporated by reference in their entireties.

FIELD OF THE DISCLOSED SUBJECT MATTER

The invention relates to an electronic circuit protected by masking and exploiting a circuit-specific customization so as to reduce the scope of attacks by observation and reduce the cost of implementing the protection. The invention applies notably to the field of the protection of circuits which manipulate confidential data, in which the cryptography circuits are an example.

BACKGROUND

The activity of the electronic circuits can be observed during their operation through the physical quantities such as the power consumption, the computation time or electromagnetic radiation.

These physical quantities depend both on the computation architectures and on the data manipulated within the circuit. Information concerning the processed data is therefore indirectly available on the outside of the circuit by observation of said quantities called hidden channels or auxiliary channels.

The dissipation of these physical quantities can compromise the security of systems processing secret data protected notably by cryptography methods. Thus, if secret data are protected by using a symmetrical cryptography algorithm, the robustness of the protection lies in the capacity to keep the encryption key secret. The dissipation of the physical quantities may allow a third party to obtain said key by implementing suitable attacks and, consequently, to access the secret data. An attack by observation of physical quantities dissipated by said circuit is usually qualified simply as an attack by observation. Hereinafter in the description, a third party using attack by observation methods to access data not intended for him is called attacker, and the dissipated physical quantities are called leaks or hidden channels.

There are, today, powerful observation attacks making it possible to access data processed by protected circuits.

Thus, attacks by observation of leaks representative of the data processing times of the circuit exist, as described in the article by P. C. Kocher, J. Jaffe and B. Jun entitled *Timing Attack on Implementations of Diffie-Hellman, RSA, DSS and Other Systems*, Proceedings of CRYPTO '96, volume 1109 LNCS, pages 104-113, Springer-Verlag, 1996.

Attacks by observation of the consumption of the circuits can also be used by an attacker, by using, for example, DPA-type methods, these type of attacks being described in the article by P. C. Kocher, J. Jaffe and B. Jun entitled *Differential Power Analysis*, Proceedings of CRYPTO '99, volume 1666 LNCS, pages 388-397, Springer-Verlag, 1999.

These methods make it possible to circumvent the security conferred at the mathematical level by cryptography.

It is relatively simple to balance a time-related algorithm of processing times. It is more difficult to protect the circuits against instantaneous observation of the wave form of the electrical consumption.

There are various countermeasure methods for protecting an electronic circuit against attacks on the hidden channels. Their characteristics are notably specified by common criteria defined at the international level or by standards, such as, for example, the American FIPS standard 140, the acronym FIPS standing for "Federal Information Processing Standardization".

Some countermeasures merely increase the number of measurements necessary for an attack to succeed. Such is the case, for example, for the countermeasure methods using a non-functionalized noise generator implemented alongside the computation logic. For example, a pseudorandom number generator PRNG, randomly initialized, can serve this purpose. In this case, any measurement collected by an attacker is disturbed by a noise which is overlaid on the hidden channel. The attacks become more complex because it is necessary, in practice, to perform more measurements in order to amplify the expected signal-to-noise ratio for the countermeasure technique to be effective.

Other countermeasure techniques protect against the attacks by observation by masking the hidden channels and usually involve, during the processing operation to be protected, a random or pseudorandom variable m called mask. Said variable is used in such a way that the result of the computation does not depend on said mask, but on the leaks of information through the hidden channels that depend thereon.

Thus, the masking-based countermeasure techniques are implemented by interleaving the sensitive data flowing within the cryptography circuit with the mask variable m, this interleaving being used to prevent the hidden channel from being analyzed by an attacker. The sensitive data or variables x correspond to variables that are both entirely predictable and share non-zero mutual information with the secret. This technique amounts to modifying the representation of the sensitive data x, to the quantity x⊕m corresponding to the Vernam encryption of x by applying the key m using the operation ⊕ designating an exclusive-OR type operation, also designated by the acronym XOR hereinafter in the description.

The mask may be conditioned by a signature specific to each circuit, in which case it is shown that the leak of the key is encrypted by said mask. This specific feature avoids so-called "cataloguing" attacks, in which circuit clones can be used to model the leaks.

The usual countermeasure techniques involving a random masking withstand direct attacks on the prediction of the attack registers of the first order, such as, for example, the attacks of DPA type or the attacks of CPA type, CPA standing for "Correlation Power Analysis". They are implemented, for example, by duplicating the data processing paths in the circuit.

This duplication implies a significant increase in the complexity of the circuit compared to an unmasked implementation.

Moreover, these countermeasures are bad at withstanding attacks of an order greater than or equal to two. As an example, the second order attacks exploit the fact that the variance of the leak depends on the sensitive variable x. The estimation of the variance is performed either by combining the leaks of information on the two occasions when x⊕m and also m are used, or by estimating the combined distribution of the pair (x⊕m, m) when the mask and the masked datum are used simultaneously. The attacks of second order based on the estimation of the variance are called "zero-offset" attacks, and are described in the article by E. Peeters, F. Standaert, N. Donckers and J-J. Quisquater entitled *Improved Higher Order Side-Channel Attacks with FPGA experiments*, Josyula R. Rao and Berk Sunar editors, Cryptographic Hardware and Embedded Systems—Proceedings of CHES, volume 3659 LNCS, pages 309-323. Springer-Verlag, 2005.

SUMMARY

One aim of the invention is notably to overcome the above-mentioned drawbacks.

To this end, the subject of the invention is a cryptography circuit protected by masking, said circuit comprising means for encrypting binary words using at least one key $k_r^c$, means for applying linear processing operations and nonlinear processing operations to said words, means for masking said words. The binary words are unmasked upstream of the nonlinear processing operations by using a mask $k_r^i$ and masked downstream of said processing operations by using a mask $k_{r+1}^i$, the masks $k_r^i$ and $k_{r+1}^i$ forming part of a set of masks specific to each instance of the circuit.

According to one aspect of the invention, the nonlinear processing operations, the unmasking upstream of the nonlinear processing operations and the masking downstream of the linear processing operations are implemented in a ROM-type memory.

The masks $k_r^i$ are, for example, secondary masks deduced from primary masks $k^i$ such that $k_{r+1}^i = P(k_r^i)$ and $k_0^i = k^i$, the function P(x) corresponding to a function for permutating elements of x, the ROM memories remaining unchanged.

In one embodiment, the function P(x) is a circular permutation, a secondary mask of index r+1 being deduced from a secondary mask of index r by circularly permutating the mask $k_r^i$ of a chosen number of bits d.

In another embodiment, the main masks $k^i$ are of length W and consist of an integer number of submasks of length S, the secondary masks $k_r^i$ being generated by permutation of said submasks.

The submasks of the secondary masks are, for example, chosen by using the expression:

$$k_{r+1}^i[x] = k_r^i[\mathrm{mod}(x-Q, W/S)]$$

in which:
 r is the round number;
 i is a 4-bit number drawn randomly;
 Q is an integer for controlling the rate of permutation between two consecutive secondary masks $k_r^i$ and $k_{r+1}^i$;
 S is the length of a submask expressed in bits;
 W is the length of the main mask expressed in bits;
 mod( ) is a defined function such as mod(a,b)=a modulo b, a and b being integer numbers.

According to one aspect of the invention, the main encryption mask $k^i$ is modified regularly by randomly choosing a mask $k^i$ from a set of main masks stored in the circuit.

According to another aspect of the invention, the set of main masks stored in the circuit is different from one circuit to another.

The set of main masks is obtained using a circuit for generating masks intrinsic to the component.

In one embodiment, the Hamming distance between two masks $k_r^i$ and $k_{r+1}^i$ is substantially equal to S/2.

The Hamming weight of a mask $k^i$ is, for example, substantially equal to W/2.

According to one aspect of the invention, the nonlinear processing operations are implemented using S-boxes.

The nonlinear processing operations are applied, for example, after the linear processing operations in one and the same combinatory block just before the sampling of the result in a register.

The circuit is, for example, implemented in an FPGA.

The set of main masks is obtained, for example, using the modification of the FPGA circuit configuration file.

The circuit comprises, for example, dynamic reconfiguration means making it possible to update the set of main masks and the tables implementing the parts of the circuit corresponding to the nonlinear processing operations.

In one embodiment, the circuit is implemented in an ASIC.

The invention notably has the advantage of not significantly increasing the complexity of the circuit through the implementation of protection by masking, notably concerning the parts of the circuit handling the nonlinear processing operations. The invention also has the advantage of allowing for the use of a predetermined set of masks of reduced size, said set being able to be different from one circuit to another so as to render the protection unique between circuits obtained from the same production row.

BRIEF DESCRIPTION OF THE DRAWINGS

Other features and advantages of the invention will become apparent from the following description given as a nonlimiting illustration, and in light of the appended drawings in which.

DETAILED DESCRIPTION

The masking principle, known to those skilled in the art, consists in modifying the representation of the sensitive variables x into a redundant representation. This representation comprises at least two portions, one portion corresponding to the masked sensitive data denoted $x \oplus m$ and one portion corresponding to the mask m. The sum of these two portions in the binary Galois field where they are defined makes it possible to retrieve the variable x by using the following property:

$$x = (x \oplus m) \oplus m \quad (1)$$

As an example, in a block encryption algorithm such as DES or AES, the result of the operation to encrypt a block of data is derived from the repetition of a number of rounds. A "round" is a computation cycle in which at least two types of transformations have been executed, one linear and the other nonlinear, also called transformation by substitution.

The aim of linear transformation is to mix the symbols or the groups of symbols presented at its input by following predefined rules and so create the diffusion.

The transformation by substitution is usually carried out using substitution tables, called S-boxes, and helps to break the linearity of the encryption structure. By using this type of transformation, symbols or groups of symbols are replaced by other symbols or groups of symbols in order to create confusion.

Thus, the pair of portions $(x \oplus m, m)$ is transformed into a pair $(\mathrm{round}(x \oplus m'), m')$, the function round( ) designating the functional operation of a round, whereas m' is the new round mask.

The linear parts of each round are simply duplicated. The linearity of the functions L( ) of said parts means that:

$$L(x \oplus m) = L(x) \oplus L(m) \quad (2)$$

The linearity thus makes it possible to use the mask $m_L = L(m)$ as new mask after transformation.

On the other hand, the implementation of the masking on the nonlinear parts, that is to say the S-boxes, induces a significant increase in terms of implementation cost. A mask $m_{NL}$ taking into account this transformation and making it possible to retrieve $S(x)$ from $S(x \oplus m)$ must be determined such that:

$$S(x) = S(x \oplus m) \oplus m_{NL} \quad (3)$$

For this, $m_{NL}$ can be expressed using a function $S'( )$ defined such that:

$$m_{NL} = S'(x, x \oplus m) = S(x) \oplus + S(x \oplus m) \quad (4)$$

The function $S'( )$ therefore has twice as many inputs as the function $S( )$. Thus, the implementation of the masking for nonlinear functions $S( )$ amounts to adding the square of the complexity of S.

Figure 1:
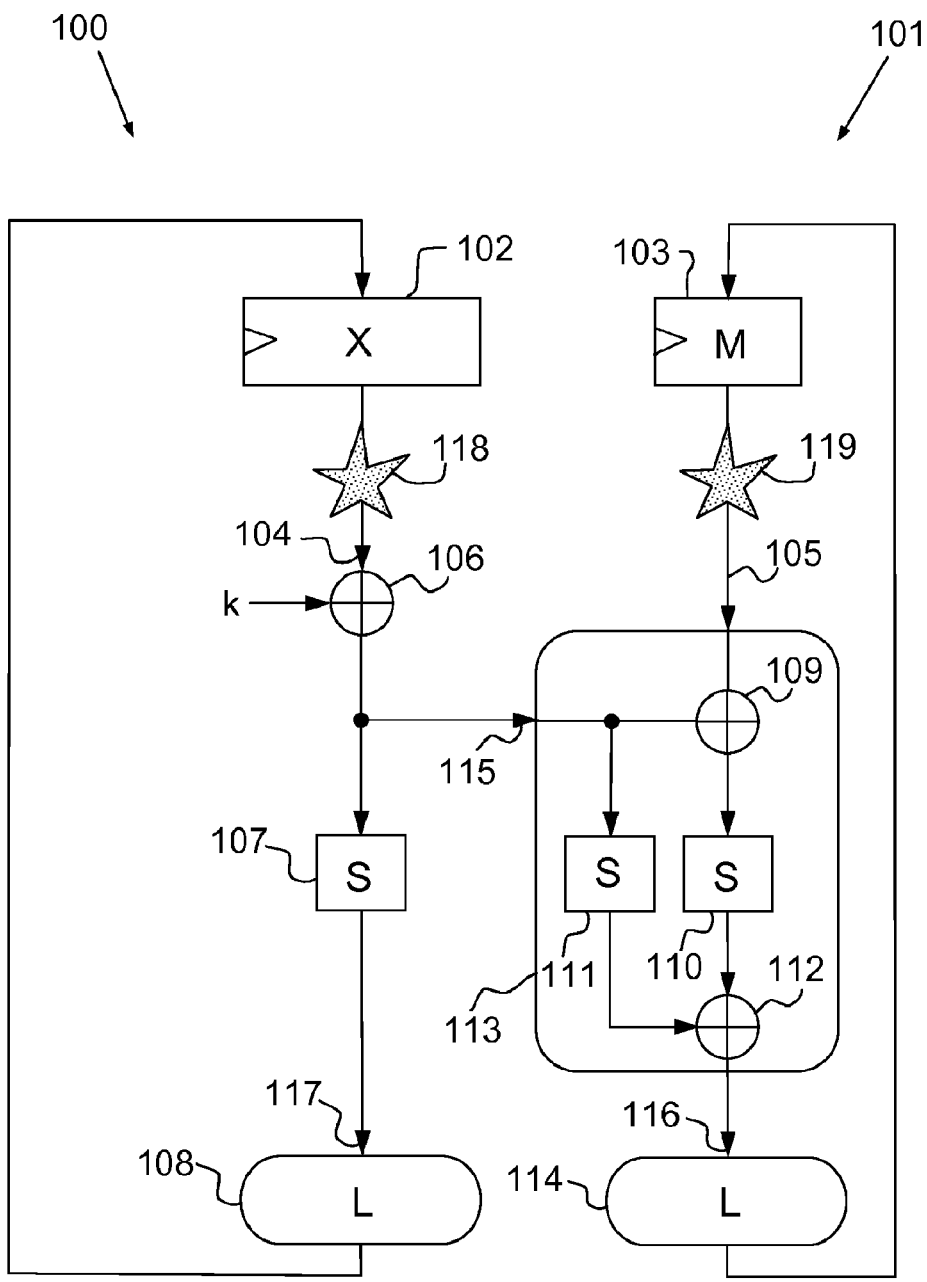
FIG. 1 presents the example of a Feistel function protected by masking.

In order to illustrate the implementation of the masking in a cryptography circuit, FIG. 1 presents the example of a Feistel function protected by masking. This type of function is notably used for the block encryption of DES type, DES standing for "Data Encryption Block".

The implementation of the masking of the sensitive data x requires, as explained previously, two parts 100, 101.

The first part 100 corresponds to the processing operations carried out on the portion $x \oplus m$ and the second part 101 corresponds to the processing operations carried out on the part m.

The encryption of the sensitive data is performed by applying a key k to the block to be encrypted followed by an $S( )$ function S-box and the application of a linear function $L( )$.

The digital signals to be processed by the two pathways 100, 101 of the circuit are synchronized by using a register 102, 103 for each pathway.

The first pathway 100 processes the portion comprising the masked sensitive data x, that is to say $x \oplus m$. The encryption key k is applied by using an XOR gate 106. The resulting signal corresponds to $x \oplus m \oplus k$. An S-box 107 then makes it possible to obtain the signal $S(x \oplus m \oplus k)$ 117 to which a linear function L is applied 108.

The second pathway 101 processes the portion corresponding to the mask m. As explained previously, the application of a nonlinear function $S( )$ 107 to a masked signal usually means that it is taken into account in the processing of the second portion. Thus, the function $S'( )$ defined by the expression (4) is implemented 113 by using two S-boxes and 2 XOR gates 109, 112. The function takes as input on the one hand the mask m 105 and on the other hand the signal $x \oplus m \oplus k$ 115 resulting from the application of the encryption key k in the first pathway 100. The signal 116 resulting from the application $S'( )$ has applied to it a linear function $L( )$ 114 so as to take into account the linear function 108 of the first pathway 100. The function $S'( )$ can be implemented in a memory of ROM type so that it is protected against attacks by observations. It is in fact particularly difficult to observe, for example, the variations of electrical consumption in such a memory.

Even though such an implementation is protected by masking and the observation of the activity linked to the function $S'( )$ is difficult to observe, security loopholes make it fragile, notably against attacks of the second order. It is for example possible for an attacker to position two probes for observing the electrical consumption at two distinct circuit nodes, for example at the outputs 118, 119 of the two input registers of each pathway. An attack based on the estimation of the variance, that is to say of "zero-offset" type, is in this case very effective.

Figure 2:
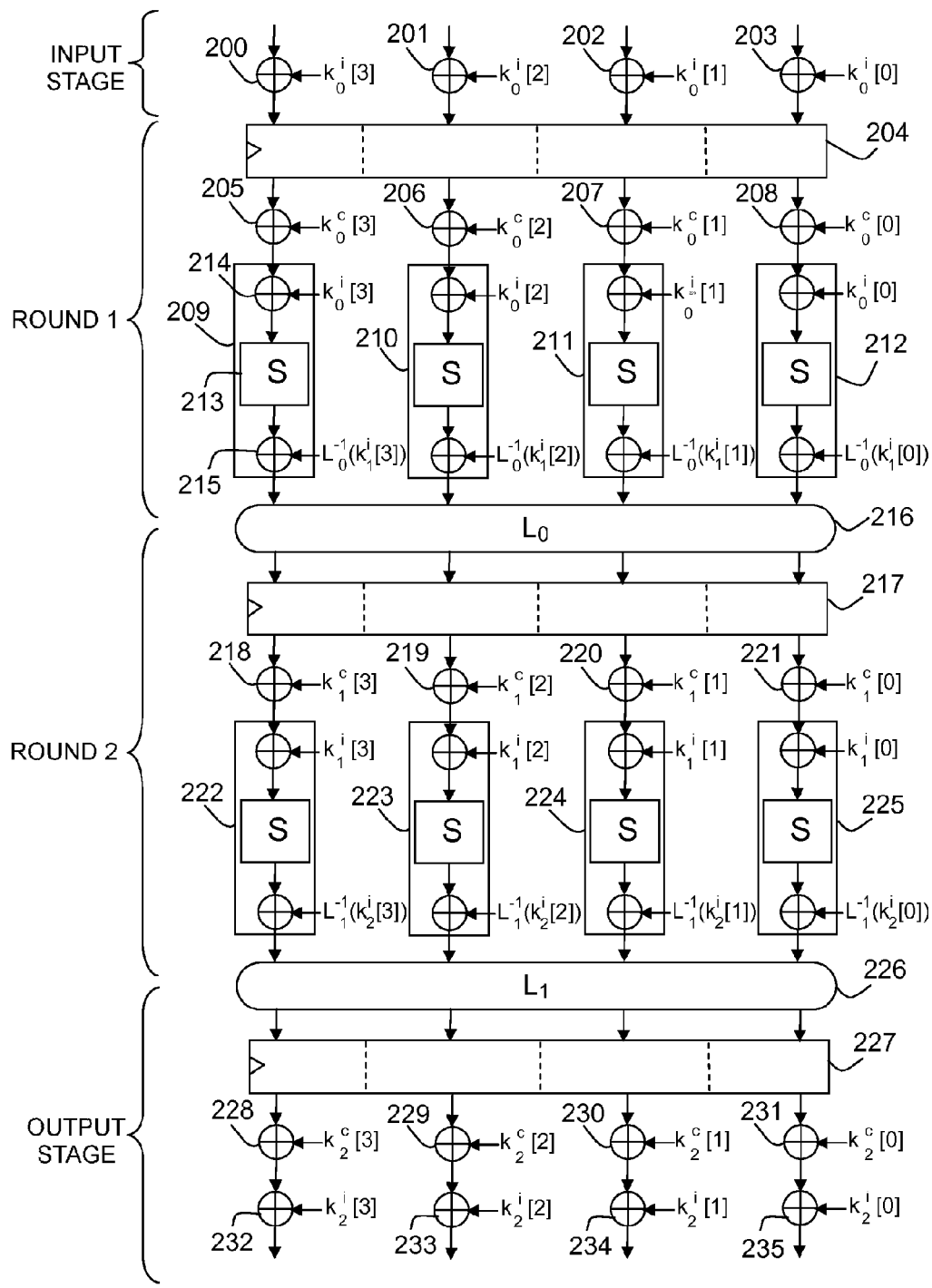
FIG. 2 gives an example of a cryptography circuit protected by masking, the nonlinear parts being unmasked.

FIG. 2 gives an example of a cryptography circuit protected by masking on which the invention is based. It should be noted that there is no longer any masking path which, advantageously, makes attacks of the second order impossible as described previously.

As explained previously, when the unmasked parts of an encryption circuit are contained in a memory, it is difficult to attack the variables internal to said memory. In other words, a memory is considered as a black box protected against leaks of information. Only the inputs or the outputs are vulnerable. One of the objectives of the circuit described is to exploit an implementation in memory with a customized masking method of moderate complexity.

Moreover, when the use of memories is not suitable, the computation elements can be ordered in such a way as to position the nonlinear parts as far as possible away from the output of the registers. As an example, a correlation attack is all the less effective when it is conducted deeply in the combinatory logic of the circuit.

The example of FIG. 2 presents an example of implementation of the invention in a circuit based on the use of an SPN network, SPN standing for "Substitution Permutation Network". This type of circuit is also called Shannon S-P network. In this example, an encryption in two rounds is considered. Binary words of index r denoted $k_r^i$ and $k_r^c$ are used respectively as masking key and encryption key.

The circuit presented as an example can be broken down into a number of stages, namely an input stage, a stage corresponding to the first round, a stage corresponding to the second round and an output stage. The data to be encrypted are presented as input to the input stage, for example in the form of 32-bit words subdivided into four 8-bit subwords. An input masking is applied by using the key $k_0^i$ with a length of 32 bits, said key being subdivided into four 8-bit submasks $k_0^i[0]$, $k_0^i[1]$, $k_0^i[2]$, $k_0^i[3]$, said submasks being applied to the four 8-bit subwords by using four XOR gates 200, 201, 202, 203.

At the input of the first round, a register 204 takes as input the four 8-bit subwords resulting from the masking by the key $k_0^i$. This register makes it possible to synchronize the different binary flows, a flow corresponding to an input 8-bit subword. A first encryption key $k_0^c$, subdivided into four 8-bit subkeys denoted $k_0^c[0]$, $k_0^c[1]$, $k_0^c[2]$, $k_0^c[3]$, is applied in four XOR gates 205, 206, 207, 208 on the masked subwords presented as output of said register 204. The key $k_0^c$ is associated with the first encryption round. The four subwords of data masked by $k_0^i$ and encrypted by $k_0^c$ are then respectively processed by four processing blocks 209, 210, 211, 212 implemented in a memory, for example of ROM type. It should be noted that the complexity of implementation of functions, notably nonlinear functions, in a ROM memory increases exponentially with the number of inputs. The cryptographic algorithms incorporate this constraint and process the words to be encrypted as subwords of smaller size at the nonlinear function level in order to minimize the complexity of implementation.

At the input of each processing block, the 8-bit subwords are unmasked by applying the four 8-bit submasks $k_0^i[0]$, $k_0^i[1]$, $k_0^i[2]$, $k_0^i[3]$ using XOR gates 214. A nonlinear function is then applied, an S-box 213 being able to be used to implement it.

Upstream of the output of each processing block, an XOR gate 215 is used to mask the data at the output, so that the sensitive data are masked at the output of the first round stage by a mask $k_1^i$ subdivided into four submasks $k_1^i[0]$, $k_1^i[1]$, $k_1^i[2]$, $k_1^i[3]$. A linear transformation $L_0( )$ is applied at the round output, this having to be taken into account for the masking in the processing blocks. For this, the masking is carried out by using a modified mask $L_0^{-1}(k_1^i)$ of the mask $k_1^i$. This is subdivided into four 8-bit modified submasks $L_0^{-1}(k_1^i[0])$, $L_0^{-1}(k_1^i[1])$, $L_0^{-1}(k_1^i[2])$, $L_0^{-1}(k_1^i[3])$, the transformation $L_0^{-1}()$ corresponding to the inverse of the linear transformation $L_0()$ 216.

At the output of the processing blocks 209, 210, 211, 212, the transformation $L_0()$ is applied to the binary words presented as output from said blocks. The result of the first encryption round corresponds to the binary subwords at the output of the linear transformation 216, said subwords corresponding to sensitive data masked by the mask $k_1^i$ and therefore protected against attacks by observations.

The input of the second round is the output of the first round and corresponds to the four 8-bit subwords resulting from the linear transformation 216 of the first round. These four subwords are presented as input for a register 217 making it possible to synchronize the different binary flows.

A second encryption key $k_1^c$ specific to the second round, subdivided into four 8-bit subkeys denoted $k_1^c[0]$, $k_1^c[1]$, $k_1^c[2]$, $k_1^c[3]$, is applied in four XOR gates 218, 219, 220, 221 to the masked subwords presented as output from the register 217.

The four data subwords masked by $k_1^i$ and encrypted by $k_1^c$ are then respectively processed by four processing blocks 222, 223, 224, 225 implemented in a memory, for example, of ROM type. At the input of each block, the data are unmasked by applying the key $k_1^i$ using XOR gates.

A nonlinear function is then applied, an S-box being able to be used in each block to implement it. At the output of each processing block, an XOR gate is used to mask the data at the output, so that the sensitive data are masked at the output of the second round stage by the mask $k_2^i$. For this, the masking is carried out by using a modified mask $L_1^{-1}(k_2^i)$, the transformation $L_1^{-1}()$ corresponding to the inverse of a linear transformation $L_1()$ 226.

The transformation $L_1()$ is applied to the binary subwords presented as output from the processing blocks 209, 210, 211, 212. The result of the second encryption round corresponds to the binary subwords at the output of the linear transformation 226, said subwords corresponding to the sensitive data masked and therefore protected against attacks by observation.

An advantage of this type of implementation is that it is possible to invert the encryption by $k_0^c$ and the masking by $k_0^i$ for the round 1 as well as the encryption by $k_1^c$ and the masking by $k_1^i$ for the round 2.

So as to reduce the complexity of implementation and to always use the same ROM memories, it is proposed to deduce the implementation masks used from one step to another by a permutation of a main mask. For example, if $k^i$ is the main mask, the secondary masks $k_0^i$, $k_1^i$ and $k_2^i$ can be deduced from the main mask as follows:

$$k_0^i = k^i$$

$$k_1^i = P(k_0^i)$$

$$k_2^i = P(k_1^i)$$

the function P(bin) representing a permutation function, for example a circular permutation of the binary word bin. Furthermore, the main mask $k^i$ can be drawn at random from a predefined set of main masks. One example of mask permutation on the basis of a main mask is given in the description using FIG. 3.

The small size of the set of main masks advantageously makes it possible to use customized masks specific to the component, that is to say, specific to each instance of the circuit. The application of this signature makes it possible to reduce the range of the attacks of "cataloging" type, because the leaks thus become specific to a circuit and no longer to a circuit type. The high order attacks HO-DPA, an acronym deriving from the expression "higher-order differential power analysis", such as, for example, those of "zero-offset" type, are challenged because there is no longer any specific mask path. It is therefore no longer possible to consider the pair (masked variable, mask).

Figure 3:
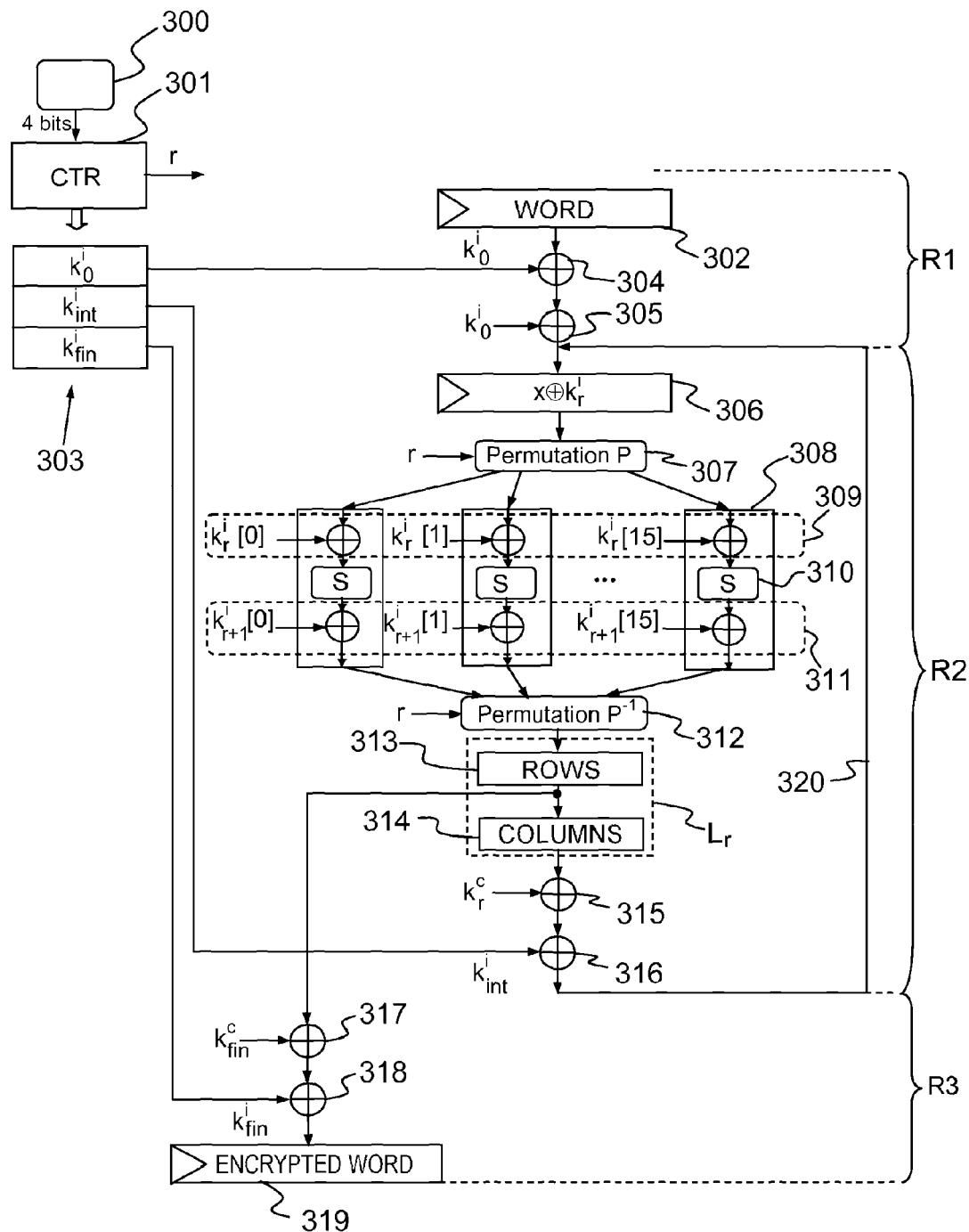
FIG. 3 illustrates an implementation of the AES algorithm protected by masking according to the invention.

FIG. 3 illustrates an implementation of the AES algorithm protected by masking.

The AES block encryption algorithm, AES standing for "Advanced Encryption Standard", is particularly powerful in keeping binary messages secret. The message to be protected is processed by binary words of fixed size, said words being able to be 128, 192 or 256 bits. The encryption keys are of length W, W being equal to the length of the words to be processed. The algorithm comprises three processing phases, each phase consisting of one or more rounds. The first phase R1 corresponds to an initialization round, the second phase R2 corresponds to N rounds using the same structure iteratively and the third phase R3 corresponds to a final round. The principle of these three phases specific to the AES algorithm is known to those skilled in the art.

The circuit is, for example, an FPGA or ASIC circuit.

A protection by masking according to the invention can be introduced so as to protect the AES cryptography circuit implementing the three phases R1, R2 and R3 against attacks by observation of the hidden channels.

A random number generator 300 is used to generate binary words i, for example of n bits, n representing the entropy of the masking. In the example described hereinafter in the description, n is represented on 4 bits.

A counter CTR 301 increments a variable r corresponding to the current round number.

The protected circuit comprises a memory area 303 making it possible notably to store a set of constant masks of length equal to that of the words to be encrypted, or 128 bits in this example.

The number i generated randomly 300 makes it possible to select a main mask $k^i$ from the set of masks stored 303. Consequently, for n=4, 16 different main masks $k^i$ can be selected randomly.

Moreover, the main masks stored in the component may be different from one product component to another, so as to obtain a differentiated protection and avoid "attacks by cataloguing".

A main mask $k^i$ of length W is made up of an integer number of submasks of length S, W being a multiple of S. For example, a mask $k^i$ of length W=128 bits comprises for example 16 submasks of S=8 bits, said submasks being denoted $k_0^i[0], k_0^i[1], \ldots, k_0^i[15]$.

From a main mask, secondary masks can be generated, for example for permutating the submasks that make up the main mask. Thus, from a single main mask, a different secondary mask can be used for each round.

So as to increase the robustness to attacks, there is a set of main masks $k^i$ that is different from one component to another so as to implement a differentiated masking protection between said components. The variable i is random and can be generated before each encryption.

Once the main mask $k^i$ is chosen, a secondary mask of index r+1 is deduced from a secondary mask of index r by circularly permutating, with a permutation P, the mask $k_r^i$ of a chosen number of bits d, the mask of index 0 being initialized such that $k_0^i = k^i$.

d can be chosen such that d=S bits for example, that is to say of a length corresponding to a submask.

It is also possible to have the mask of index r permutated by an integer number of submasks. Thus, the mask $k_{r+1}^i$ can be generated by using the expression:

$$k_{r+1}^i[x]=k_r^i[\mod(x-Q,W/S)] \quad (5)$$

in which:
- r is the round number;
- i is a number of 4 bits drawn randomly by the generator 300;
- Q is an integer making it possible to check the permutation rate between two consecutive secondary masks $k_r^i$ and $k_{r+1}^i$;
- S is the length of a submask expressed in bits;
- W is the length of the mask $k^i$ expressed in bits;
- mod( ) is a function defined such that mod(a,b)=a modulo b, a and b being integer numbers.

The main mask can, for example, be modified during an encryption procedure by randomly drawing a new value of i.

Advantageously, the resistance to attacks by observation can be optimized by choosing the main masks $k^i$ such that the secondary masks are independent of one another, for example by guaranteeing that the Hamming distance between $k_r^i$ and $k_{r+1}^i$ is substantially equal to S/2.

An average balancing of the masks also makes it possible to reinforce the protection, said balancing being obtained by guaranteeing that the Hamming weight of a secondary mask and therefore of the main mask is substantially equal to W/2.

In the example of the figure, the words to be encrypted are 128-bit words and are presented as input to the coder in a register base 302. The word to be processed is then masked by application of the non-permutated key $k_0^i=k^i$ using an XOR gate 304. The result of the masking is then encrypted by application of an encryption key of length W denoted $k_0^c$ using a second XOR gate 305.

The word masked by $k_0^i$ and encrypted by $k_0^c$ is stored in a register 306, said register corresponding to the input of the part of the circuit performing the second processing phase R2, said phase corresponding to an iterative encryption loop, an iteration corresponding to a processing round. The word stored in the register 306 is processed by a control module 307 subdividing the 128-bit word into 16 8-bit subwords. Another function of the control module is to select the mask $k_r^i$ to be used to unmask the data at the start of a round, a round being applied on each iteration of index r. The 16 8-bit subwords are processed using nonlinear function modules 308, said modules being implemented in a memory of ROM type, for example. These modules unmask 309 the subwords presented to their input, apply to them a nonlinear processing 310 for example by using S-boxes, and mask 311 the result of said processing. There is a nonlinear function module 308 for each 8-bit subword to be processed. Consequently, there are 16 nonlinear function modules for the example of FIG. 3.

For the round of index r, these modules use the submasks $k_r^i[0], k_r^i[1], \ldots, k_r^i[15]$ for the input unmasking 309 and the submasks $k_{r+1}^i[0], k_{r+1}^i[1], \ldots, k_{r+1}^i[15]$ for the output masking 311. For example, the 16 S-boxes can be precomputed in order to be masked by the submasks $k_r^i[\ ]$ then unmasked by the submasks $k_{r+1}^i[\ ]$.

The 16 subwords at the output of the nonlinear processing modules are then directed toward a second control module 312, the function of which is notably to concatenate said words into a 128-bit word.

The 128-bit word is then processed by two linear processing modules, a first performing a mixing of the rows 313, usually described by the expression "shift rows" and a second processing operation performing a mixing of the columns 314, usually described by the expression "shift columns". These two linear processing operations can be modeled by a function $L_r(\ )$.

An encryption using a key $k_r^c$ is applied to the 128-bit word resulting from said linear processing operations, using an XOR function 315.

A 128-bit mask $k_{int}^i$ is applied 316 to the word resulting from the encryption by $k_r^c$ so as to be able to use the same S-boxes from one round to another. The masks $k_{int}^i$ are stored 303 after having been precomputed by using the expression:

$$k_{int}^i = k_{r+1}^i \oplus L_r^{-1}(k_r^i) \quad (6)$$

There are thus in memory 16 precomputed 128-bit words $k_{int}^i$.

The processing operations of the phase R2 are executed N times iteratively. When the N rounds of the second phase R2 have been executed, the final phase R3 is executed on the 128-bit word extracted between the linear row mixing processing operation 313 and the linear column mixing processing operation 314.

After a final encryption using a key $k_{fin}^c$ applied by an XOR function 317 to the extracted word, a final unmasking is performed by applying a 128-bit mask $k_{fin}^i$ using an XOR function 318.

The 16 128-bit masks $k_{fin}^i$ are stored 303 in the protected circuit after having been precomputed by using the expression:

$$k_{fin}^i = k_R^i \oplus L'_r{}^{-1}(k_r^i) \quad (7)$$

in which the function $L'_r{}^{-1}(\ )$ represents the inverse of the row mixing processing operation 313.

The word obtained at the end of the final row, that is to say at the end of the processing phase R3, corresponds to the final result of the AES encryption. The encrypted message obtained is written into an output register 319.

Figure 4:
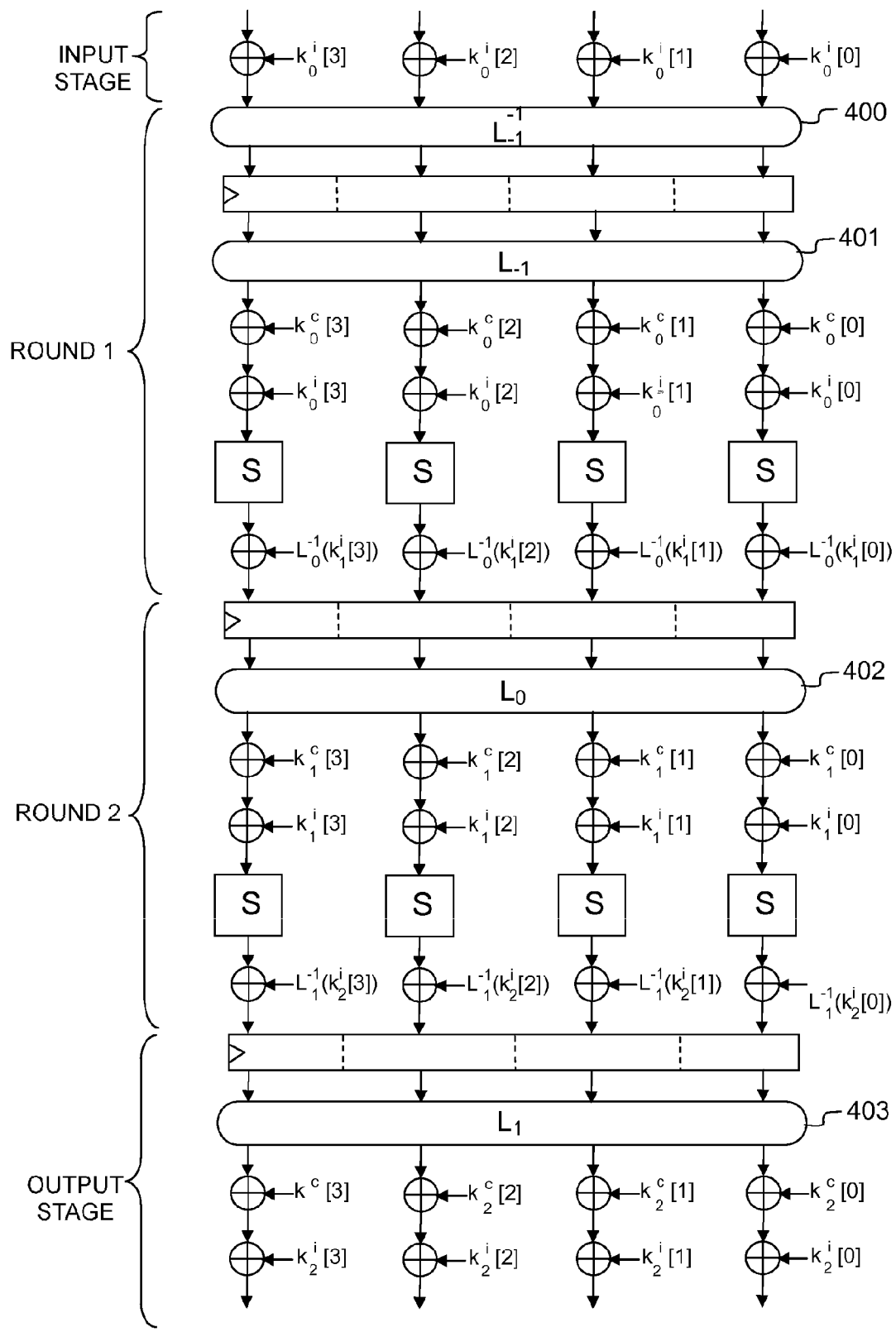
FIG. 4 gives an example of a cryptography circuit protected by masking in which the nonlinear processing operations are positioned at the end of a round.

FIG. 4 gives an example of a cryptography circuit protected by masking in which the nonlinear processing operations are positioned at the end of a round.

When the parts of the circuit corresponding to the nonlinear processing operations are implemented in logic gates and not in memory, the upstream unmasking and downstream masking functions of said processing operations may be the subject of attacks.

In order to protect the circuit against these attacks, one solution is to place the nonlinear processing operations of a round at the end of the logic cone, that is to say, just before the registered sampling of the result. The computations are then spread by virtue of their time dispersion and the effectiveness of the attack is then limited.

The example of FIG. 4 gives an example of a cryptography circuit protected by masking implementing this principle.

This exemplary circuit resembles the one presented by FIG. 2. The encryption is performed using a Feistel architecture and is performed by virtue of the implementation of one input stage, two round stages called round 1 and round 2, then one output stage.

Unlike the circuit given as an example with FIG. 2, the nonlinear processing operations, implemented for example with S-boxes, are placed at the end of the logic cone. The linear processing operations are therefore placed at the start of a round. Thus, at the stage corresponding to the first round, a linear processing operation corresponding to an initial diffusion function $L_{-1}(\ )$ is applied 401. At the stage corresponding to the second round, a linear processing operation corresponding to a diffusion function $L_0(\ )$ is applied 402.

The inverse $L_{-1}^{-1}(\ )$ of the initial diffusion function is applied 400 at the output of the input stage and a final diffusion function $L_1(\ )$ is applied 403 at the input of the output stage.

The electrical consumption at the start of a round is difficult to model, whereas it is made more dependent on the environmental conditions at the end of a round.

The invention claimed is:

1. A cryptography circuit protected by masking, said cryptography circuit comprising:
   means for encrypting a plurality of binary words using at least one key $k_r^c$;
   means for applying linear processing operations and nonlinear processing operations to said plurality of binary words; and
   means for masking said plurality of binary words, wherein the plurality of binary words are unmasked upstream of the nonlinear processing operations by using respective masks $k_r^i$ and masked downstream of the nonlinear processing operations by using respective masks $k_{r+1}^i$, the masks $k_r^i$ and $k_{r+1}^i$ forming part of a set of masks specific to each instance of the cryptography circuit,
   wherein each said mask $k_r^i$ is a secondary mask deduced from primary masks $k^i$ such that $k_{r+1}^i = P(k_r^i)$ and $k_0^i = k^i$, the function $P(x)$ corresponding to a function for permutating elements of x, and
   wherein the primary masks $k^i$ are composed of an integer number greater than one of submasks of a same length, the secondary masks $k_r^i$ being generated by permutation of said submasks.

2. The cryptography circuit as claimed in claim 1, wherein the nonlinear processing operations, the unmasking upstream of the nonlinear processing operations and the masking downstream of the nonlinear processing operations are implemented in ROM-type memories.

3. The cryptography circuit as claimed in claim 1, $$k_{r+1}^i[x] = k_r^i[\mathrm{mod}(x-Q, W/S)]$$

in which:
   r is a round number;
   i is a 4-bit number drawn randomly;
   Q is an integer for controlling a rate of permutation between two consecutive secondary masks $k_r^i$ and $k_{r+1}^i$;
   S is a length of a submask expressed in bits;
   W is a length of the primary mask expressed in bits; and
   mod( ) is a defined function such that mod(a,b) = a modulo b, a and b being integer numbers.

4. The cryptography circuit as claimed in claim 3, wherein a Hamming distance between two masks $k_r^i$ and $k_{r+1}^i$ is equal to S/2.

5. The cryptography circuit as claimed in claim 3, wherein a Hamming weight of a mask $k^i$ is equal to W/2.

6. The cryptography circuit as claimed in claim 1, wherein each of the primary encryption mask $k^i$ is modified regularly by randomly choosing a mask $k^i$ from a set of primary masks stored in the cryptography circuit.

7. The cryptography circuit as claimed in claim 6, wherein the set of primary masks stored in the cryptography circuit is different from one cryptography circuit to another.

8. The cryptography circuit as claimed in claim 7, wherein the set of primary masks is obtained using an internal mask generation circuit.

9. The cryptography circuit as claimed in claim 1, wherein the nonlinear processing operations are implemented using S-boxes.

10. The cryptography circuit as claimed in claim 1, wherein the nonlinear processing operations are applied after the linear processing operations in one and the same combinatory block just before a sampling of a result in a register.

11. The cryptography circuit as claimed in claim 10, wherein the set of primary masks is obtained using modification of an FPGA cryptography circuit configuration file.

12. The cryptography circuit as claimed in claim 10, wherein the cryptography circuit comprises dynamic reconfiguration means to update the set of primary masks and tables implementing the parts of the cryptography circuit corresponding to the nonlinear processing operations.

13. The cryptography circuit as claimed in claim 1, wherein the cryptography circuit is implemented in an FPGA.

14. The cryptography circuit as claimed in claim 1, wherein the cryptography circuit is implemented in an ASIC.

* * * * *

UNITED STATES PATENT AND TRADEMARK OFFICE
CERTIFICATE OF CORRECTION

PATENT NO. : 9,197,412 B2  
APPLICATION NO. : 13/509494  
DATED : November 24, 2015  
INVENTOR(S) : Guilley et al.

Page 1 of 1

It is certified that error appears in the above-identified patent and that said Letters Patent is hereby corrected as shown below:

In the claims:

Column 11, line 37, claim 3, "as claimed in claim 1" should read --as claimed in claim 1, wherein the submasks of the secondary masks are chosen by using the expression:--.

Signed and Sealed this
Twenty-fourth Day of May, 2016

Michelle K. Lee
*Director of the United States Patent and Trademark Office*